United States Patent [19]
Isa et al.

[11] 3,891,683
[45] June 24, 1975

[54] PROCESS FOR MANUFACTURING POLYOL ESTERS OF CARBOXYLIC ACIDS

[75] Inventors: Hiroshi Isa, Funabashi; Takeo Inagaki, Yachiyo; Yasuhiro Kiyonaga, Narashino; Masuzo Nagayama, Tokyo, all of Japan

[73] Assignee: Lion Fat & Oil Co., Ltd., Tokyo, Japan

[22] Filed: Feb. 4, 1974

[21] Appl. No.: 439,271

[30] Foreign Application Priority Data
Feb. 7, 1973   Japan................................ 48-015268

[52] U.S. Cl......... 260/410.6; 260/497 R; 260/497 B
[51] Int. Cl............................................. C07c 67/00
[58] Field of Search....... 260/410.9 R, 410.6, 497 C

[56] References Cited
UNITED STATES PATENTS
3,507,891   4/1970   Hearne et al................... 260/410.9
FOREIGN PATENTS OR APPLICATIONS
2,023,690   11/1970   Germany

OTHER PUBLICATIONS

Falbe, "Carbon Monoxide in Organic Synthesis," Springer–Verlag, New York, (1970), pp. 78–82, 106–107.

*Primary Examiner*—Donald G. Daus
*Assistant Examiner*—Diana G. Rivers
*Attorney, Agent, or Firm*—Woodhams, Blanchard and Flynn

[57] ABSTRACT

A process for manufacturing polyol esters of carboxylic acids is disclosed, wherein olefins having from 3 to 30 carbon atoms, carbon monoxide and polyhydric alcohol are reacted with one another in the presence of a first catalyst containing cobalt, nickel or rhodium and a second catalyst consisting of pyridine or its derivatives by heating at elevated pressures, characterized in that said first catalyst and said second catalyst are brought in contact with carbon monoxide in the presence of said olefin prior to effecting said reaction.

6 Claims, No Drawings

PROCESS FOR MANUFACTURING POLYOL ESTERS OF CARBOXYLIC ACIDS

BACKGROUND OF THE INVENTION a. Field of the Invention

The present invention relates to a process for manufacturing polyol esters of carboxylic acid from olefins, carbon monoxide and polyhydric alcohol in high yield.

b. Description of the Prior Art

Polyol esters of carboxylic acids have a wide application range of use such as lubricants, plasticizers, cosmetic raw material and surface active agents and they have been ordinarily produced by the reaction of natural fatty acids with polyhydric alcohols. However, the distribution of the carbon atoms in the carbon chain in natural fatty acids is biased, and the available natural resources of fatty acids having from 6 to 10 carbon atoms which are important as the starting materials for preparing aviation lubricants and heat resistant plasticizers are rather limited. Accordingly, with the recent increase in the range of uses of such fatty acids, the esterification of synthetic fatty acids has become important from the view point of stable supply.

There are some processes for manufacturing synthetic fatty acids, such as the Reppe process as well as the Koch process employing olefin as the starting material, and the paraffin oxidation process employing paraffin as the starting material, but in each of these known processes, branched fatty acid is obtained as by-product. The branched fatty acid is so much inferior to the linear fatty acid in reactivity that it requires a considerably complicated procedure for completing its esterification with polyhydric alcohol, rendering it difficult to synthesize polyol esters of carboxylic acid directly from such fatty acid.

Meanwhile, with a view to further simplification of process, it has also been attempted to produce monohydric alcohol esters of carboxylic acid directly from olefines (as the starting material for the synthetic fatty acid), carbon monoxide and alcohol, but application of this process to polyhydric alcohols has not succeeded. The monohydric alcohol used in this prior process is a lower alcohol such as methanol and ethanol, and it is recognized that direct application of the conditions used in the esterification of such monohydric alcohol to those of polyhydric alcohol would result in low yield, as to be unsuitable for industrial process.

Further, in the case of producing an aldehyde by the reaction of olefin with carbon monoxide and hydrogen, that is, the so-called oxo reaction at low temperature, employment of cobalt stearate as catalyst tends to prolong the induction period for reaction so that it is considered convenient to employ dicobalt octacarbonyl as catalyst. In the case of employing dicobalt octacarbonyl as a catalyst in manufacturing esters by reacting olefin with carbon monoxide and a lower monohydric alcohol, the reaction is preceded by some induction period, but this period is about 10 minutes at the most so that it is negligible from the industrial point of view. Also in the case of employing a cobalt salt of a fatty acid, such as cobalt stearate, as catalyst, inasmuch as said catalyst is converted into dicobalt octacarbonyl in less than 10 minutes under the reaction conditions, there is no serious problem. However, when the alcohol employed is a polyhydric alcohol, the induction period for the reaction is prolonged even when dicobalt octacarbonyl is employed as catalyst, not to speak of employment of cobalt salt of fatty acid such as cobalt stearate, and accordingly, a substantial effect can not be expected even when the said cobalt fatty acid salt is treated with carbon monoxide and hydrogen prior to effecting the reaction.

SUMMARY OF THE INVENTION

The present invention is based on the above-described concept, and is to provide a process for manufacturing polyol esters of carboxylic acid, wherein olefin having 3–30 carbon atoms, carbon monoxide and polyhydric alcohol are reacted with one another in the presence of a first catalyst containing cobalt, nickel or rhodium and a second catalyst consisting of pyridine or its derivatives, by heating at elevated pressures, characterized in that said first catalyst and said second catalyst are brought in contact with carbon monoxide in the presence of the said olefin prior to effecting said reaction.

The olefin for use herein is an $\alpha$- or inner-olefin having from 3 to 30 carbon atoms and may have branched chains.

Examples of the applicable olefin, are propylene, butene-1, hexene-1, 2-ethylhexene-1, octene-1, hexene-2, octene-2, tetradecene-3 and their analogues. Various mixtures of these compounds are also useful. As to the polyhydric alcohol used in the present invention, any polyhydric alcohol is effective. For example, there are ethylene glycol, trimethylol propane, pentaerythritol, glycerin, diethylene glycol, propylene glycol, butane diol, pentane diol, dipentaerythritol, neopentyl glycol and their analogues. The ratio of olefin to polyhydric alcohol may be changed at will according to the number of hydroxyl groups of the polyhydric alcohol, but it is preferabale that, in the case of partial esterification, said olefin and polyhydric alcohol are almost equivalent stoichiometrically, while in the case of esterifying all hydroxyl groups thereof, the olefin is in stoichiometric excess relative to the polyhydric alcohol.

Carbon monoxide used in the present invention may contain a small amount of hydrogen as an impurity, but the presence of more than 10 percent by volume of this impurity is undesirable as it will entail an increase of impurities in the product ester. The quantity of carbon monoxide to be applied at the first stage of reaction or pretreatment is stoichiometrically in excess relative to olefin.

The reaction pressure is more than 60 Kg/cm$^2$ - preferably more than 90 Kg/cm$^2$, but any elevation of pressure in excess of 300 Kg/cm$^2$ will not be advantageous.

As a cobalt-containing catalyst for use in the present invention, such compounds as will produce dicobalt octacarbonyl in the reaction system or form dicobalt octacarbonyl, cobalt-carbonyl hydride or those derivatives thereof under the reaction conditions are effective: as such compounds, there are, for instance, cobalt octanoate, cobalt stearate, cobalt hydroxide and their analogues such as cobalt oxide, cobalt chloride, cobalt oxalate and cobalt carbonate. The appropriate amount of said cobalt-containing catalyst relative to alcohol is in the range of 0.001–0.1 moles, and preferably 0.002 to 0.05 moles, per equivalent of hydroxyl group of said alcohol. As a nickel- or rhodium-containing catalyst used in the present invention, there can be employed compounds similar to those used in the case of the cobalt-containing catalyst, and the applicable amount thereof is also similar to that in the case of the cobalt-containing catalyst: as the nickel-containing catalyst, there are, for instance, nickel octanoate, nickel stearate, nickel hydroxide and their analogues such as nickel oxide, nickel chloride, nickel naphthenate and nickel carbonate. As the rhodium-containing catalyst, there are, for instance, rhodium octanoate, rhodium stearate, rhodium hydroxide and their analogues such as rhodium chloride, rhodium nitrate and rhodium sulfate.

As pyridine or its derivatives, there are pyridine, β-picoline, γ-picoline, 3,5-lutidine, 4-ethylpyridine and their analogues such as 4-propylpyridine, 3,5-diethylpyridine and 4-vinylpyridine. The appropriate amount of said pyridine or its derivatives relative to the first catalyst is in the range of from 3 to 100 moles/mole and preferably from 3 to 50 moles/mole.

The appropriate reaction temperature is higher than 90°C, but in view of the fact that application of a temperature higher than 250°C will cause decomposition of the catalyst, it is preferably in the range of from 90° to 250°C.

In the case of treating the catalyst with olefin and carbon monoxide prior to effecting the reaction, the pressure and temperature to be applied suffice to be almost the same as the above-described reaction conditions. The time for treatment is preferably more than 3 minutes in the case of employing dicobalt octacarbonyl, and more than 10 minutes in the case of employing other catalysts.

Further, it is feasible to add to the reaction system any such solvent as will not impede the reaction or which will accelerate it, like tetrahydrofuran, dioxane, benzene, hexane, etc.

In the conventional processes, fatty acid is first produced from olefin and then is allowed to react directly with alcohol in the presence of an acid catalyst, or the fatty acid is esterified by means of an acid chloride. On the contrary, in the process of the present invention, polyol ester can be obtained directly from olefin, by means of a fatty acid, and thus the process can be greatly simplified. Besides, in the conventional processes, when branched fatty acid is contained in the reaction mixture, it is difficult to produce an ester containing a branched chain by direct esterification of a fatty acid and an alcohol, while in the process of the present invention, such an ester can be easily produced. According to the process of the present invention, the ratio of conversion of hydroxyl groups is high and consequently polyol esters of high purity can be obtained in high yield, compared with the process wherein the treatment of the catalyst with carbon monoxide prior to reaction is dispensed with at the time of effecting the reaction of olefin, carbon monoxide and polyhydric alcohol with one another.

The invention is further elucidated in the following by reference to some examples of embodiment thereof as well as comparative examples.

DESCRIPTION OF THE PREFERRED EMBODIMENTS

Comparative Example 1.

In a 300 ml stainless steel autoclave, 0.65 moles of octene, 0.167 moles of trimethylol propane, 0.016 moles of cobalt octylate and 0.24 moles of γ-picoline were charged and allowed to react under the pressure of carbon monoxide 150 Kg/cm$^2$ at 160°C while stirring for 8 hours. After cooling, the thus obtained reaction mixture was taken out of the autoclave and directly subjected to gas chromatographic analysis. As a result, the content of triesters in the whole esters was 38 percent.

Comparative Example 2.

In a 300 ml stainless steel autoclave, 0.63 moles of octene-1, 0.167 moles of trimethylol propane, 0.008 moles of dicobalt octacarbonyl and 0.24 moles of γ-picoline were charged and allowed to react under the pressure of carbon monoxide 150 Kg/cm$^2$ and the pressure of hydrogen 3 Kg/cm$^2$ at 160°C while stirring for 5 hours. After cooling, the thus obtained reaction mixture was taken out of the autoclave and directly subjected to gas chromotographic analysis. As a result, the content of triester in the whole ester was 44 percent.

Example 1.

In a 300 ml stainless steel autoclave, 0.65 moles of octene-1, 0.016 moles of cobalt octanoate and 0.24 moles of γ-picoline were charged and subjected to 10 minutes' stirring under the pressure of carbon monoxide 150 Kg/cm$^2$ and the pressure of hydrogen 3 Kg/cm$^2$ at 160°C, followd by 5 hours' stirring under the same pressure and at the same temperature as above after adding 0.167 moles of trimethylol propane to the resulting mixture, whereby reaction of the mixture was effected. After cooling, the thus obtained reaction mixture was taken out of the autoclave and directly subjected to gas chromatographic analysis to find that the content of triesters in the whole esters was 89 percent.

Example 2.

In a 300 ml stainless steel autoclave, 0.65 moles of hexene-1, 0.016 moles of cobalt octanoate, 0.24 moles of pyridine and 0.1 moles of water were charged and subjected to 30 minutes' stirring under the pressure of carbon monoxide 150 Kg/cm$^2$ at 160°C, followed by 5 hours' stirring under the same pressure and at the same temperature as above after adding 0.167 moles of trimethylol propane to the resulting mixture, whereby reaction of the mixture was effected. After cooling, the thus reacted mixture was taken out of the autoclave and directly subjected to gas chromatographic analysis to find that the content of triesters in the whole esters was 99.8 percent.

EXAMPLE 3.

In a 300 ml stainless steel autoclave, 0.4 moles of tetradecene-1, 0.01 moles Of cobalt stearate, 0.15 moles of γ-picoline and 0.1 moles of water were charged and subjected to 30 minutes' stirring under the pressure of carbon monoxide 180 Kg/cm$^2$ at 165°C, followed by 7 hours' stirring under the same pressure and at the same temperature as above after adding 0.1 moles of glycerol to the resulting mixture, whereby reaction of the mixture was effected. After cooling, the thus reacted mixture was taken out of the autoclave and directly subjected to gas chromatographic analysis to find that the content of diesters in the whole esters was 97 percent.

EXAMPLE 4.

In a 300 ml stainless steel autoclave, 1.4 moles of butene-1, 0.008 moles of dicobalt octacarbonyl, 0.24 moles of γ-picoline and 0.1 moles of water were charged and subjected to 5 minutes' stirring under the pressure of carbon monoxide 150 Kg/cm$^2$ at 160°C, followed by 6.5 hours' stirring under the same pressure and at the same temperature as above after adding 0.25 moles of neopentyl glycol to the resulting mixture, whereby reaction of the mixture was effected. After cooling, the thus reacted mixture was taken out of the autoclave and directly subjected to gas chromatographic analysis to find that the content of diesters in the whole esters was 90 percent.

EXAMPLE 5.

In a 300 m*l* stainless steel autoclave, 0.7 moles of hexene-2, 0.016 moles of cobalt octanoate and 0.24 moles of γ-picoline were charged and subjected to 10 minutes' stirring under the pressure of carbon monoxide 150 Kg/cm$^2$ at 160°C, followed by 6 hours' stirring under the same pressure and at the same temperature as above after adding 0.125 moles of pentaerythritol to the resulting mixture, whereby reaction of the mixture was effected. After cooling, the thus obtained reaction mixture was taken out of the autoclave and directly subjected to gas chromatographic analysis to find that the content of tetraesters in the whole esters was 91 percent.

What is claimed is:

1. In a process for preparing polyol esters of carboxylic acids, comprising reacting an olefin having from 3 to 30 carbon atoms and a polyhydric alcohol, wherein the molar ratio of said olefin to the reactive hydroxyl groups of said polyhydric alcohol is about 1/1 or more, with an excess of carbon monoxide at a pressure in the range of from 60 to 300 kg/cm$^2$, the reaction being carried out at a temperature of from 90° to 250°C., in the presence of a first catalyst of cobalt, nickel or rhodium, and a second catalyst of pyridine, alkylated pyridine or vinyl pyridine, the improvement which comprises the steps of:

contacting said first and second catalysts with said carbon monoxide and said olefin, in the absence of said polyhydric alcohol, at a temperature and a pressure within the aforesaid ranges to obtain a pretreated catalyst composition, and then adding said polyhydric alcohol to the reaction system and carrying out said polyol ester manufacturing process using said pretreated catalyst composition.

2. A process according to claim 1, wherein the quantity of said first catalyst is in the range of 0.001 to 0.1 moles per equivalent of hydroxyl groups of said polyhydric alcohol, and the amount of said second catalyst is in the range of from 3 to 100 moles per mole of said first catalyst.

3. A process according to claim 1, wherein said first catalyst is selected from the group consisting of cobalt octanoate, cobalt stearte, cobalt hydroxide, cobalt oxide, cobalt chloride, cobalt oxalate, cobalt carbonate, nickel octanoate, nickel stearate, nickel hydroxide, nickel oxide, nickel chloride, nickel naphthenate, nickel carbonate, rhodium octanoate, rhodium stearate, rhodium hydroxide, rhodium oxide, rhodium nitrate and rhodium sulfate, and the second catalyst is selected from the group consisting of pyridine, β-picoline, γ-picoline, 3,5-lutidine, 4-ethylpyridine, 4-propylpyridine, 3,5-diethylpyrine and 4-vinylpyridine.

4. A process according to claim 1 wherein the first catalyst is a cobalt compound selected from the group consisting of cobalt octanoate, cobalt stearate and dicobalt octacarbonyl, and said second catalyst is a compound selected from the group consisting of pyridine and γ-picoline.

5. A process according to claim 1 in which the first catalyst is cobalt octanoate, said second catalyst is a member of the group consisting of pyridine and γ-picoline and the duration of said contacting step is at least 10 minutes.

6. A process according to claim 1 wherein the first catalyst is dicobalt octacarbonyl, said second catalyst is γ-picoline and the duration of said contacting step is at least 3 minutes.

* * * * *

UNITED STATES PATENT OFFICE
CERTIFICATE OF CORRECTION

Patent No. 3,891,683　　　　　　　　Dated　June 24, 1975

Inventor(s) Hiroshi Isa, Takeo Inagaki, Yasuhiro Kiyonaga and Masuzo Nagayama

It is certified that error appears in the above-identified patent and that said Letters Patent are hereby corrected as shown below:

Col. 6, line 22; change "3,5-diethylpyrine" to

---3,5-diethylpyridine---.

Signed and Sealed this twenty-eight Day of October 1975

[SEAL]

Attest:

RUTH C. MASON　　　　　　　　　　C. MARSHALL DANN
*Attesting Officer*　　　　　　　　*Commissioner of Patents and Trademarks*